United States Patent [19]

Kronberg

[11] Patent Number: 5,157,426
[45] Date of Patent: Oct. 20, 1992

[54] FALSE COLOR VIEWING DEVICE

[76] Inventor: James W. Kronberg, 108 Independent Blvd., Aiken, S.C. 29801

[21] Appl. No.: 697,158

[22] Filed: May 8, 1991

[51] Int. Cl.$^5$ .................. G02C 7/10; G02B 5/22
[52] U.S. Cl. .................... 351/163; 351/165; 359/885; 359/892
[58] Field of Search .............. 351/163–165; 359/885, 892

[56] References Cited

U.S. PATENT DOCUMENTS

| | | | |
|---|---|---|---|
| 3,356,439 | 12/1967 | Magnus | 351/47 |
| 3,571,649 | 3/1971 | Bush, Jr. | 313/112 |
| 3,877,797 | 4/1975 | Thornton, Jr. | 351/44 |
| 4,045,125 | 8/1977 | Farges | 350/166 |
| 4,247,177 | 1/1981 | Marks et al. | 351/44 |
| 4,529,269 | 7/1985 | Mutzhas | 350/312 |
| 4,542,959 | 9/1985 | Kreutzig | 350/311 |
| 4,740,070 | 4/1988 | Vance | 351/163 |
| 4,783,361 | 11/1988 | Ovshinsky et al. | 428/217 |
| 4,878,748 | 11/1989 | Johansen et al. | 351/44 |
| 4,911,546 | 3/1990 | Cohen | 351/44 |
| 4,952,046 | 8/1990 | Stephens et al. | 351/163 |
| 4,961,640 | 10/1990 | Irlen | 351/44 |

Primary Examiner—Scott J. Sugarman
Attorney, Agent, or Firm—Harold M. Dixon; William R. Moser; Richard E. Constant

[57] ABSTRACT

A viewing device for observing objects in near-infrared false-color comprising a pair of goggles with one or more filters in the apertures, and pads that engage the face for blocking stray light from the sides so that all light reaching the user's eyes come through the filters. The filters attenuate most visible light and pass near-infrared (having wavelengths longer than approximately 700 nm) and a small amount of blue-green and blue-violet (having wavelengths in the 500 to 520 nm and shorter than 435 nm, respectively). The goggles are useful for looking at vegetation to identify different species and for determining the health of the vegetation, and to detect some forms of camouflage.

11 Claims, 2 Drawing Sheets

FALSE COLOR VIEWING DEVICE

BACKGROUND OF THE INVENTION

1. Field of the Invention

The present invention relates to devices for viewing in false color. In particular, the present invention enables viewing light reflected or transmitted by objects that is mostly in the near-infrared region of the spectrum. The U. S. Government has rights in this invention pursuant to Contract No. DE-AC09-89SR18035 between the U.S. Department of Energy and Westinghouse Savannah River Company.

2. Discussion of Background

Light of wavelengths between 400 and 700 nanometers is commonly considered to be "visible light", and light outside this band of wavelengths, "invisible" ultraviolet or infrared. The response of the human eye, however, does not stop abruptly at these boundaries; instead, it drops off gradually. The eye can respond to wavelengths as short as 350 nm in the ultraviolet and as long as 1050 nm in the infrared, provided that the light source is sufficiently strong and that the interference from ordinary "visible light" is minimized. The band from 700 nm to 1050 nm will hereinafter be called the "deep-red", indicating that it can be seen (and, in fact, appears red) yet lies beyond what is normally considered the "red" end of the visible spectrum.

"False color" is a technique applied to the mapping of large amounts of data regarding (typically) three physical quantities onto a plane to form a visible, multi-colored image. Each of the three quantities is coded into a different "channel" of signal intensity and represented by a different additive primary color: red, green, or blue. Each hue in the resulting image thus represents a different combination of values of the quantities under study. The simplest and most common form of this technique, which attempts to represent "true color", is seen in color photography or color television transmission; here each primary color represents its own light intensity in a scene.

Analogously, in conventional "near-infrared false color" each channel maps a primary color adjacent to its own. "Blue" signals are not used; instead, an "extra color" is taken from the near-infrared region of the spectrum, around 800 nanometers or "deep-red." "Deep-red" becomes red in the final image; "red" becomes green in the image and "green" becomes blue. The overall effect is as if the image had been Doppler-shifted one channel's width toward the blue end of the spectrum.

Near-infrared false color has several uses. Most of these take advantage of the fact that vegetation reflects strongly in the near-infrared as well as in the green region. Near-infrared false color converts these primaries to red and blue, respectively, so vegetation usually appears in red and purple tones. Moreover, the near-infrared "brightness" of plants is dependent both on plant species and on health. As a result, near-infrared images can reveal the type of vegetation growing in a particular area or, in an area dominated by one species (as in a pine forest or corn field), point out areas of diseased or struggling plants. Near-infrared can be used to distinguish some types of camouflage from natural, growing vegetation or to identify other objects or materials, such as minerals, which have similar visible colors but differ in their near-infrared reflectivities.

Two methods are commonly used to produce near-infrared images. In one of these, a specialized color video camera has green, red, and near-infrared channels but sends its output to a conventional color monitor which displays the corresponding information in blue, green, and red, respectively. The other method is photographic: using near-infrared-sensitive film and combining the infrared photograph with others taken in visible light, either on the same film or on ordinary color film, to produce the final false-color version.

Both of these methods have significant disadvantages. While the video method can display images in real time (that is, without significant delay), it requires heavy, delicate, expensive and power-hungry electronic equipment. The photographic method has the advantage of using relatively ordinary camera and developing equipment, but output is delayed by film processing. Both methods depend on optical systems which must be maintained in proper focus at all times, and require proper light levels so that images are not over- or under-exposed. While automatic focusing and exposure control can be provided in both methods, the necessary equipment adds weight, bulk and complexity, and requires power to operate. Even with these controls, a trained operator is generally needed to ensure that the system functions properly.

An ideal near-infrared viewing device would be lightweight, rugged, compact, cheap and easy to build and maintain, while requiring little or no power to operate and little or no specialized operator training.

SUMMARY OF THE INVENTION

According to its major aspects and broadly stated, the present invention is a device for viewing objects in near-infrared false color. The device is for use against a surface such as the face of a viewer in the instance of goggles, or against a lens mounting in the case of a video recorder or other conventional, visual image recording device. The device comprises an opaque frame with one or more apertures in which are mounted filters for attenuating light, and in particular visible light, but passing deep-red light having wavelengths in excess of 700 nm, preferably also passing a small amount of blue-green light in the wavelength region 500–520 nm, and optionally also blue and violet light of wavelengths 435 nm and shorter. There may be one filter for deep-red and others for blue and for green blue and for green or one filter made with a combination of dyes that attenuate the colors of light to the degree necessary for practicing the invention. The frame has means for sealing against the surface to prevent intrusion of light other than through the filters. The sealing means is preferably a resilient, opaque pad attached to the frame and encircling the apertures. In the case of goggles, two generally circular pads engage the face of the user so that the only light seen by the user comes through the filters in the apertures and the goggles fit comfortably against the face.

An important feature of the present invention is the addition of a small amount of blue-green, visible light to the deep-red light transmitted through the filters in the apertures. This addition triggers the brain of the user to see the image transmitted in full color and to see it more sharply focussed than if a single, monochromatic deep-red color is transmitted. However, transmitting deep-red light without the blue-green addition will enable the discrimination of various species of foliage and the recognition of the condition of that foliage.

Another feature of the present invention is the use of simple filters in what are conventional goggles. This feature enables full color, near-infrared false-color viewing in a light-weight, rugged, compact, cheap and easily made and maintained device, while requiring no power to operate and little or no specialized operator training. In the form of goggles, the present invention takes advantage of the functions of automatic focusing and exposure control already present in the user's eyes and brain.

Other features and advantages of the present invention will be apparent to those skilled in the art from a careful reading of the Detailed Description of a Preferred Embodiment presented below and accompanied by the drawings.

DETAILED DESCRIPTION OF A PREFERRED EMBODIMENT

Figure 1:
FIG. 1 is a perspective view of a viewing device according to a preferred embodiment of the present invention.

The present invention is a device for viewing, either directly by a user or indirectly by a conventional recording device, objects in near-infrared false color. The device produces a view in near-infrared false color by filtering out a substantial amount of visible light and passing deep-red with, preferably, a small amount of blue-green and optionally blue-violet light. The device is a frame with at least one aperture through which light of the selected frequencies are passed. In the frame, mounted in the apertures, are one or more filters for frequency selection. The frame itself is opaque and can be sealed against a surface, such as a face or the lens holder of a conventional visual image recording device.

In one preferred embodiment, the device is in the form of goggles with two apertures, one for each eye, and having resilient pads encircling each aperture to seal against the face of the user so that light does not enter from the sides but only through the apertures.

A single, simple cut-off filter, removing wavelengths shorter than about 750 nm, can be used as a primitive "deep-red" light viewer. Such filters, for example, are the Kodak Wratten #87 (760 nm cutoff) and the #88A (730 nm cutoff). Other commercially available filters, such as "Roscolene" theatrical lighting filters can also be used singly or in combination to yield suitable filtering characteristics.

While the eye's focus is not as sharp in the deep-red as in shorter wavelengths and its sensitivity is much less, vision adapts over the course of several minutes, making the initially very dark and blurry image gradually become brighter and sharper. Such an image, of course, is monochromatic since it represents only a single information channel, and eyestrain may occur as the eye continually tries but fails to bring the image into sharp focus.

However, if a filter passes a small amount of blue-green light as well as deep-red, while still blocking all other visible light, the eye and brain will construct a better quality image, closely approximating near-infrared false color, from the light which passes through it. The eye can focus blue-green light sharply, and thus the deep-red image becomes superimposed on the much sharper blue-green image, the brain interprets the combination as sharply focused, and eyestrain does not occur.

The addition of light in the region of sensitivity of the eye's blue and green receptors also lets the brain construct a scene in full color, rather than in monochrome red as with the Wratten filters. The result may be termed "filtered false color". Initially reds and purples seem to dominate, but the eye and brain soon compensate for the scene's odd color balance as well as for its dimness and unusual focusing requirements.

Once compensation is complete—typically a matter of one to five minutes—the view through the false-color filter very closely resembles an equivalent near-infrared false-color image generated by current photographic or video methods. Vegetation appears in the same red and purple tones, with a wide range of different, easily-distinguishable hues characteristic of different species. The chief difference is that blue and green portions of a filtered false-color view look more like their unfiltered equivalents, since the filter does not change the eye's response to these colors as much as it does the response to red and deep-red. Scenes thus appear somewhat more realistic, and objects are easier to recognize, in filtered false-color views than in conventional photographic or video false-color images.

The required strong attenuation of visible light through a false-color filter, and the eye's low sensitivity to the deep-red which is not attenuated, make the effective light level quite low. Any intrusion of unfiltered light, therefore, must be avoided if the eyes and brain are to make and keep their adjustment to filtered false-color. For this reason, any filtered false-color viewing device must include some mechanism for sealing against the intrusion of stray light to the maximum possible extent. Such a device may consist, for example, of wrap-around goggles having filtered false-color lenses and soft, opaque frames which seal against the face to exclude stray light. Goggles providing a wide field of view are preferable. Diver's or oxyacetylene welder's goggles can easily be modified for this purpose by replacing their existing lenses with new ones having false-color filtering characteristics, or by adding false-color filters inside existing lenses. Alternatively, the needed filter characteristics could be obtained, at some additional expense, through other means, such as dichroic coatings.

Figure 2:
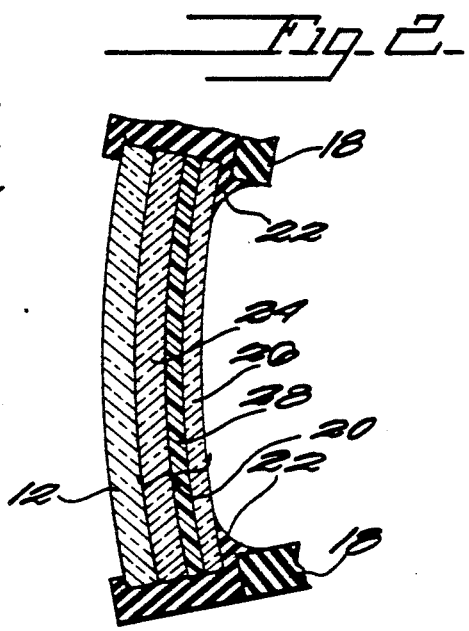
FIG. 2 is a cross sectional view of one eyepiece of the viewing device as shown in FIG. 1.

An easily-fabricated filtered false-color viewing device, embodying the principles of the invention, is made similar to lightweight diver's goggles 10, as illustrated in FIGS. 1 and 2. Goggles 10 consist of two transparent and preferably either flat or simply curved (cylindrical lenses 12, a flexible or hinged piece 14 joining them, an elastic or adjustable band 16 to hold them in place over the eyes, and two soft, opaque ring-shaped pads 18, preferably of black foam rubber, which conform to and fit closely against the face of the user to exclude stray light.

The goggles have a filter set 20 mounted against the inner surfaces of lenses 12. Between the edges of filter set 20 and pads 18 is placed a black, opaque material 22, such as epoxy or silicone rubber sealant, which fills all gaps between their edges so as to exclude stray light, and which may also help to hold filter set 20 in place.

Each filter in filter set 20 is composed of one or more layers of light-absorbing material which, in combination, have the filtered false-color spectral characteristics described above. Where multiple layers are used, a transparent adhesive of similar refractive index is preferably used to join them and minimize internal reflections; the same adhesive may or may not be used to join the filters directly to the lenses of the goggles. Each filter may, for example, consist of a layer 24 of "Straw" filter material (Roscolene #809), a layer 26 of "Dark Urban Blue" filter material (Roscolene #866), and a thin intermediate layer 28 of cyanoacrylate or similar adhesive joining them.

In an alternative preferred embodiment, lenses 12, filter set 20 and opaque material 22 are replaced by a one-piece filtering lens. Such a lens is preferably composed of a thermoplastic resin having dyes added to give the desired transmission characteristics, and fabricated by injection molding to take a form similar to that of lenses 12 in the commercially-available diver's goggles. Filtering lenses according to the present invention could be interchangeable with such lenses. The optimum combination of dyes will have to be found by experiment, easily performed by one skilled in the art from the present description. These dyes may or may not be the same as those present in "Straw" (Roscolene #809) and "Dark Urban Blue" (Roscolene #866) theatrical lighting filters, since dye formulations for these filters are proprietary and since such dyes may change their absorption spectra significantly because of the change from cellulose acetate to polystyrene or a similar matrix, and may not be compatible with the high temperatures required for injection molding.

Figure 3:
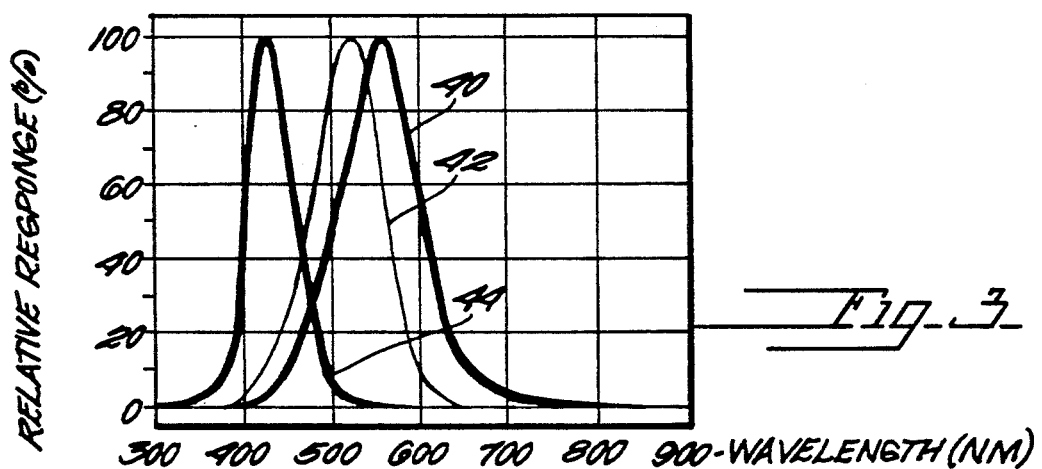
FIG. 3 is a graph showing the relative response of a human eye to red, green and blue light.

FIG. 3 shows the relative response of the human eye to unfiltered red light in curve 40, to green light in curve 42 and to blue light in curve 44. Note that the peaks are all between 400 and 700 nm, though slight sensitivity extends well beyond this range.

Figure 4:
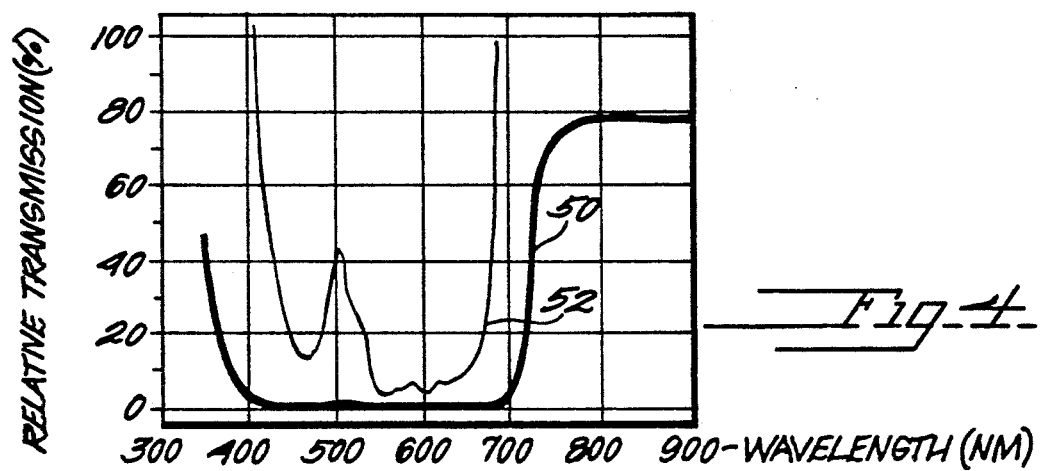
FIG. 4 is a graph showing the relative amounts of light transmitted by filters according to a preferred embodiment of the present invention.

Spectral transmission curves taken for a combination of Roscolene #809 and #866 are shown graphically in FIG. 4. Curve 50 is the "as-measured" transmission curve; curve 52 shows the same data at 100 times the scale of curve 50. This filter combination blocks almost all visible light, with transmission rising sharply outside the normally-visible range, and a small (<1%) transmission peak within it at about 500 nm, as is more clearly shown in curve 52.

Figure 5:
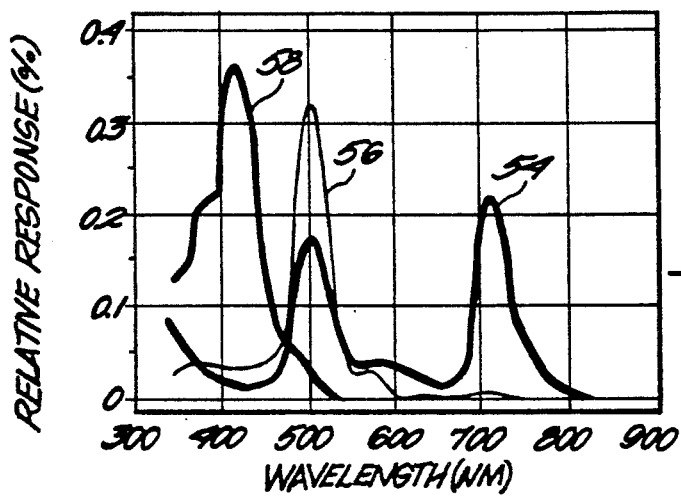
FIG. 5 is a graph of the sensitivity of the human eye to red, green and blue light filtered according to a preferred embodiment of the present invention.

Multiplying the #809–#866 transmission curves (FIG. 4) point-for-point with the typical red, green, and blue response curves 40, 42, 44, respectively, (FIG. 3) of the human eye gave modified response curves for red, green and blue, 54, 56, 58, respectively, as shown in FIG. 5, which represent the relative sensitivity of the human eye to light transmitted by the combination of the two filters.

The filter combination effectively displaces blue and green response maxima to slightly shorter wavelengths than usual; blue from 435 to 415 nm, and green from 520 to 500 nm, corresponding to the filter's visible-light transmission peak. The red response maximum, normally around 570 nm, is split into two peaks radically displaced in opposite directions; the smaller peak lying atop the green peak at 500 nm, and the larger displaced to 710 nm, at the very fringe of normal red sensitivity. Significant response extends to much longer wavelengths, ending around 800 nm.

In daylight, the combined filters appear a dull, dark magenta. Seen through them, many objects appear in altered hues because of the changed locations of the eye's sensitivity peaks.

Figure 6:
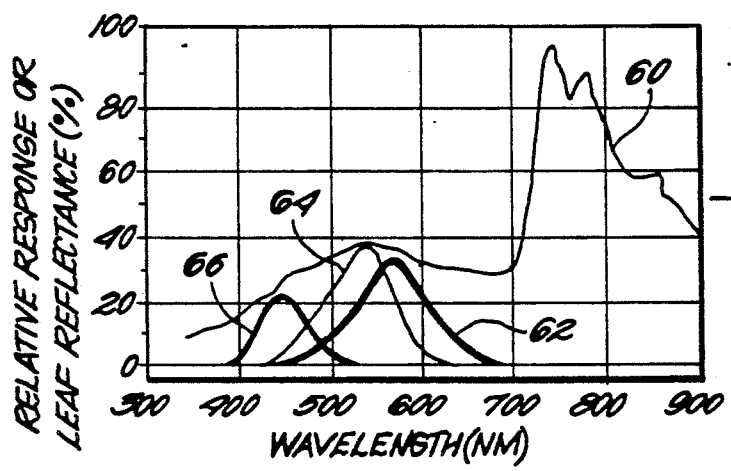
FIG. 6 is a graph of relative reflectance of sunlight by a green leaf and curves showing relative human eye responses to red, green and blue light.
Figure 7:
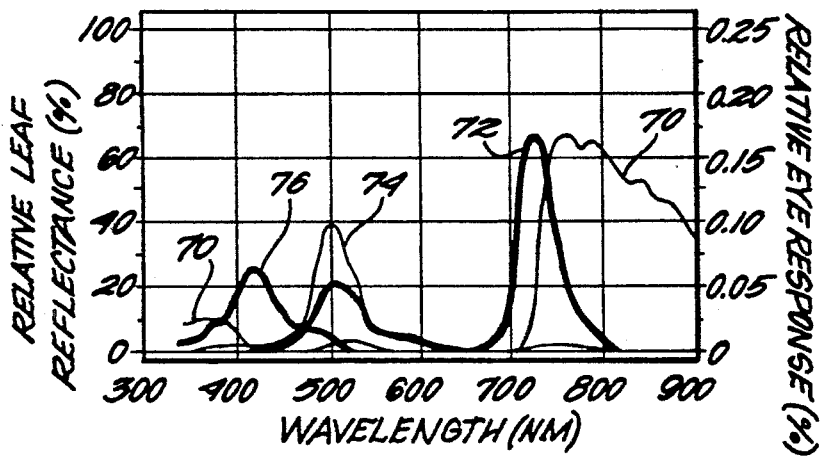
FIG. 7 is the graph again showing relative reflectance of sunlight by a green leaf but with the relative response of the human eye shifted by filters according to the present invention.

The effect is most dramatic with vegetation, which appears chiefly in red and violet tones instead of green. This results from the strong reflectivity of most organic matter in what is usually considered the near-infrared. FIG. 6 depicts a graph of the relative amount of sunlight reflected by a leaf, curve 60, and curves representing the eye's response to the red (62), green (64) and blue (66) portions of this reflected light. FIG. 7 shows the same information with curve 70 now showing the leaf's reflection spectrum after passing through the filter combination of the present invention, and curves 72, 74 and 76 showing the relative filter-shifted response of the human eye for red, green and blue portions of this light, respectively. Green leaf reflection around 540 nm normally dominates; but the filter blocks this, permitting the near-infrared reflection beyond 700 nm, now visible as red, to become dominant instead.

It will be apparent to those skilled in the art that many changes and substitutions can be made to the preferred embodiment herein described without departing from the spirit and scope of the present invention which is defined by the appended claims.

What is claimed is:

1. A device for viewing vegetation in near-infrared false-color, said device for use against a surface, comprising:

an opaque frame; and filter means mounted to said frame for passing light having a wavelength between 500 nm and 520 nm, 415 and 435 nm and greater than 700 nm but attenuating substantially all other visible light.

2. The device as recited in claim 1, wherein said filter means filters a portion of the passed light, said portion being that light having a wavelength between approximately 500 and 520 nm and approximately 415 and 435 nm.

3. The device as recited in claim 1, wherein said opaque frame further has one aperture and said filter means is mounted to said frame within said aperture so that light passed by said filter means only comes through said aperture.

4. The device as recited in claim 1, wherein said surface is a face of a user and said opaque frame further comprises a pair of goggles having two apertures, said filter means is mounted to said frame within said apertures, and means for sealing said goggles against the face of a user.

5. A device for viewing, said device for use against a surface, comprising:

a frame; and a composite filter carried by said frame, said composite filter having a first filter that attenuates light having wavelengths less than approximately 700 nm,
a second filter passing blue-green light, and
a third filter passing blue-violet light.

6. The device as recited in claim 5, wherein said second filter passes blue-green light having wavelengths between approximately 500 and 520 nm.

7. The device as recited in claim 5, wherein said third filter passes blue-violet light having wavelengths between approximately 415 and 435 nm.

8. The device as recited in claim 5, wherein said second filter passes blue-green light having wavelengths between approximately 500 and 520 nm and said third filter passes blue-violet light having wavelengths between approximately 415 and 435 nm.

9. The device as recited in claim 5, wherein said device has means for sealing said frame against said surface, said sealing means carried by said frame, said frame has at least one aperture, and said composite filter is positioned within said at least one aperture so that all light passed by said filter passes through said at least one aperture.

10. A device for viewing, said device for use against a surface, comprising:
a frame; and
a composite filter carried by said frame, said composite filter having
a first filter that attenuates light having wavelengths less than approximately 700 nm and
a second filter passing blue-violet light having a wavelength between approximately 415 and 435 nm.

11. The device as recited in claim 10, wherein said device has means for sealing said frame against said surface, said sealing means carried by said frame, said frame has at least one aperture, and said composite filter is positioned within said at least one aperture so that all light passed by said filter passes through said at least one aperture.

* * * * *